United States Patent
Zimmer et al.

(10) Patent No.: US 8,936,459 B2
(45) Date of Patent: Jan. 20, 2015

(54) METHOD AND APPARATUS FOR IN-MOLD FINISHING OF BLOW MOLDED PARTS

(75) Inventors: Ronald A. Zimmer, Dewitt, IA (US); John Ahlers, Bettendorf, IA (US)

(73) Assignee: Custom-Pak, Inc., Clinton, IA (US)

( * ) Notice: Subject to any disclaimer, the term of this patent is extended or adjusted under 35 U.S.C. 154(b) by 427 days.

(21) Appl. No.: 13/345,376

(22) Filed: Jan. 6, 2012

(65) Prior Publication Data

US 2013/0175739 A1    Jul. 11, 2013

(51) Int. Cl.
  *B29C 49/50*    (2006.01)
(52) U.S. Cl.
  USPC ........................... 425/182; 425/527; 425/806
(58) Field of Classification Search
  USPC .................................. 425/182, 184, 527, 806
  See application file for complete search history.

(56) References Cited

U.S. PATENT DOCUMENTS

| | | | | |
|---|---|---|---|---|
| 2,943,349 A | * | 7/1960 | Adams et al. | 425/527 |
| 3,031,718 A | * | 5/1962 | Adams | 425/806 |
| 3,456,290 A | * | 7/1969 | Ruekberg | 425/531 |
| 3,752,627 A | * | 8/1973 | Bourgeois et al. | 425/298 |
| 4,178,146 A | * | 12/1979 | Kinsley | 425/289 |
| 5,529,743 A | * | 6/1996 | Powell | 264/513 |
| 5,698,236 A | | 12/1997 | Hobson | |
| 5,910,283 A | | 6/1999 | Hobson | |
| 6,719,554 B2 | | 4/2004 | Hobson | |
| 2003/0090024 A1 | * | 5/2003 | Skov et al. | 425/806 |

* cited by examiner

*Primary Examiner* — Robert B Davis
(74) *Attorney, Agent, or Firm* — St. Onge Steward Johnston & Reens LLC

(57) ABSTRACT

An apparatus for creating a blow molded article is provided, including a mold having first and second mold portions that, when located adjacent each other along a seam, at least partially enclose a mold cavity, wherein the mold cavity at least partially defines a molding surface against which a wall of the blow molded article is blown during blow molding, a first cutting device moveably disposed in the first mold portion, and a second cutting device moveably disposed in the second mold portion, wherein the first and second cutting devices, when in an activated position, each have a cutting surface that extends into the mold cavity by an amount substantially equal to a desired wall thickness of the blow molded article.

21 Claims, 6 Drawing Sheets

METHOD AND APPARATUS FOR IN-MOLD FINISHING OF BLOW MOLDED PARTS

FIELD OF THE INVENTION

The present invention relates to systems and methods for producing blow molded articles. More specifically, the invention relates to a system and method of in-mold finishing of blow molded articles using a staged slicing blade.

BACKGROUND OF THE INVENTION

The use of blow-molding as a method for manufacturing various sorts of articles is generally well known. Typically, this process involves the use of a mold consisting of two separate halves or portions having cavities of particularly desired shapes and sizes. Usually, one extrudes a large-diameter, sealed tube of molten material (commonly referred to as a "parison"), places the tube between the mold halves, and closes the mold around the tube. Fluid pressure is then introduced into the tube, forcing the molten tube against the walls of the cavities, conforming the tube to the shape thereof. The pressure is maintained until the molten material cools and solidifies. The pressure is then released, the mold halves are pulled apart, and the hardened article is ejected therefrom.

Before the blow molded part is removed from the mold, it is typically separated from excess parison material called flash. This step can be completed in-mold or can involve secondary operations. Typically, once the parison is extruded between the mold halves, it is pinched off at the top and/or bottom and then blown into a part that takes the shape of the mold cavity. The pinch-off generates excess plastic material in the form of top and/or bottom flash.

Flash generation imposes limits on blow molding efficiency. Flash removal typically calls for a post-molding trim step, which requires special equipment and poses a risk of damaging good parts. Additionally, flash has potential for significantly extending the molding cycle, primarily by increasing the time needed to cool the thick flash areas. Another common undesirable feature of the flash generation is that, during the process of flash removal, an inner wall of the article dips inward at the parting line. This dip is created when the pinch-off feature on the mold closes onto the plastic parison. This common characteristic results in leaks whenever the inner surface of blow molded parts are mated or coupled for use as conduits for water, air and other fluids.

There are a number of prior art solutions to the problem of flash generation. One such solution is to keep the parison inside the entire perimeter of the blow molded part. However, this is technically impossible during the extrusion blow molding. Although the two-stage process for injection blow molding is often used to eliminate flash, it is impractical for many blow molded article shapes. The best expected outcome from extrusion blow molding is for the parison to enter the mold from one end (usually the top) and exit from the other (usually the bottom). This approach limits the indentation from the mold closing on the parison to top and bottom and provides side seams that do not indent since the flash is kept inside the part in those areas.

Another prior art solution is to compress the flash attempting to squeeze parison back into the seams at the parting line between the two mold halves. However, this method has a processing disadvantage in that the amount of compression will inevitably vary from part to part. As a result, some blow molded parts will leak from indentation and some will leak from protrusion. Either way, it is not consistent enough to prevent leaks near the parting line on the inner surface of the blow molded article.

Yet another prior art solution is to create a so-called "bottle neck" like feature using a blow pin or ram. This process requires the blow pin to be positioned inside the parison as it is being extruded so the location of the round inner wall is limited to top or bottom openings in the parison. However, this process requires an extra step during the blow molding process, thereby making the process more costly and less efficient.

What is further desired, therefore, is a system and method for creating a cut in a blow molded article, wherein the cut is made while the article is still inside the mold. What is also desired is a system and method for creating blow molded articles with shapes that require flash that avoids the indentation at the parting line between the molded halves. What is further desired is a system and method for creating blow molded articles wherein the shape of the opening and the inner wall of the article can be specifically varied and controlled. What is finally desired is a system and method for in-mold finishing of blow molded articles that is simpler and more efficient than the prior art systems.

SUMMARY OF THE INVENTION

Accordingly, an object of the present invention is to provide a method and apparatus for creating a blow molded article that allows for easy and efficient in-mold finishing of the article.

It is another object of the present invention to provide a method and apparatus for creating a blow molded article that avoids the indentation and/or varied wall thickness at the parting line between the molded halves.

It is yet another object of the present invention to provide a method and apparatus for creating a blow molded article wherein the shape of the opening and the wall thickness of the article can be precisely varied and controlled.

In order to overcome the deficiencies of the prior art and to achieve at least some of the objects and advantages listed, the invention comprises an apparatus for creating a blow molded article, including a mold having first and second mold portions that, when located adjacent each other along a seam, at least partially enclose a mold cavity, wherein the mold cavity at least partially defines a molding surface against which a wall of the blow molded article is blown during blow molding, a first cutting device moveably disposed in the first mold portion, and a second cutting device moveably disposed in the second mold portion, wherein the first and second cutting devices, when in an activated position, each have a cutting surface that extends into the mold cavity by an amount substantially equal to a desired wall thickness of the blow molded article.

In some embodiments, the cutting surface of the first and second cutting devices has a shape that substantially corresponds to a shape of the mold cavity.

In certain embodiments, the apparatus further includes at least one actuator moving the first cutting device and the second cutting device into an inactivated position, in which the cutting surface of the first and second cutting devices does not extend into the mold cavity. In some of these embodiments, the at least one actuator moves the first and second cutting devices across the mold cavity in a direction substantially perpendicular to the seam between the first and second mold portions. In certain of these embodiments, the first cutting device and the second cutting device move in opposite directions across the mold cavity when actuated by the at least one actuator. In other of these embodiments, the first cutting device and the second cutting device move in the same direction across the mold cavity when actuated by the at least one actuator.

In some embodiments, the at least one actuator is a fluid cylinder.

In certain embodiments, the apparatus also includes an opening in the mold cavity through which a pressurized fluid is introduced into the mold cavity.

In some cases, when the first mold portion and the second mold portion are positioned adjacent each other, the first and second mold portions abut each other along the seam.

In certain advantageous embodiments, at least one of the first cutting device and the second cutting device is positioned at an angle with respect to the molding surface.

An apparatus for creating a blow molded article is also provided, including a mold having first and second mold portions that, when located adjacent each other along a seam, at least partially enclose a mold cavity, wherein the mold cavity at least partially defines a molding surface against which a wall of the blow molded article is blown during blow molding, a first cutting device moveably disposed in the first mold portion, and a second cutting device moveably disposed in the second mold portion, wherein the first and second cutting devices, when in an activated position, each have a cutting surface that extends into the mold cavity by an amount greater than a desired wall thickness of the blow molded article.

A method for creating a blow molded article is further provided, including the steps of providing a first mold portion and a second mold portion, each having an inner molding surface against which a wall of the blow molded article is blown, positioning a first cutting device moveably disposed in the first mold portion and a second cutting device into moveably disposed in the second mold portion into an activated position whereby the first and second cutting devices extend beyond the molding surface in by an amount substantially equal to a wall thickness of the blow molded article, disposing a parison of molten material between the first and second mold portions, positioning the first and second mold portions adjacent each other along a seam to at least partially enclose a mold cavity, introducing pressurized fluid into the parison to expand it against the molding surface, thereby forming a final shape of the article, and displacing the first cutting device and the second cutting device to create a cut in the blow molded article.

In some embodiments, the predetermined amount is substantially equal to a desired wall thickness of the blow molded article. In other embodiments, the predetermined amount is greater than a desired wall thickness of the blow molded article.

In some embodiments, the step of positioning the first mold portion and the second mold portion adjacent each other includes joining the first mold portion and the second mold portion at a seam.

In certain embodiments, the step of displacing the first cutting device and the second cutting device is performed by at least one actuator coupled to the first and second cutting devices. In some of these embodiments, the at least one actuator is a fluid cylinder.

In some cases, the first cutting device and the second cutting device are displaced in a direction substantially perpendicular to the seam. In other cases, the first cutting device and the second cutting device are displaced in a direction at an angle to the seam.

In certain embodiments, the method further includes the step of moving the first and second cutting devices into an inactivated position in which the first and second cutting devices do not extend beyond the molding surface.

In some embodiments, the method also includes the step of ejecting the blow molded article from the mold cavity when the first and second cutting devices are in the inactivated position.

In some cases, the pressurized fluid is introduced into the mold through an opening.

In some advantageous embodiments, the first cutting device and the second cutting device are displaced in opposite directions across the mold cavity. In other advantageous embodiments, the first cutting device and the second cutting device are displaced in the same direction across the mold cavity.

In certain embodiments, the method further includes the step of controlling a pressure of the pressurized fluid is via a controller.

In some embodiments, the step of positioning the first and second mold portions adjacent each other includes compressing the molten material between the first and second cutting devices such that a pinch-off is moved from an outer circumference of the article to a point inside the article.

Other objects of the invention and its particular features and advantages will become more apparent from consideration of the following drawings and accompanying detailed description.

DETAILED DESCRIPTION OF THE INVENTION

Figure 1:
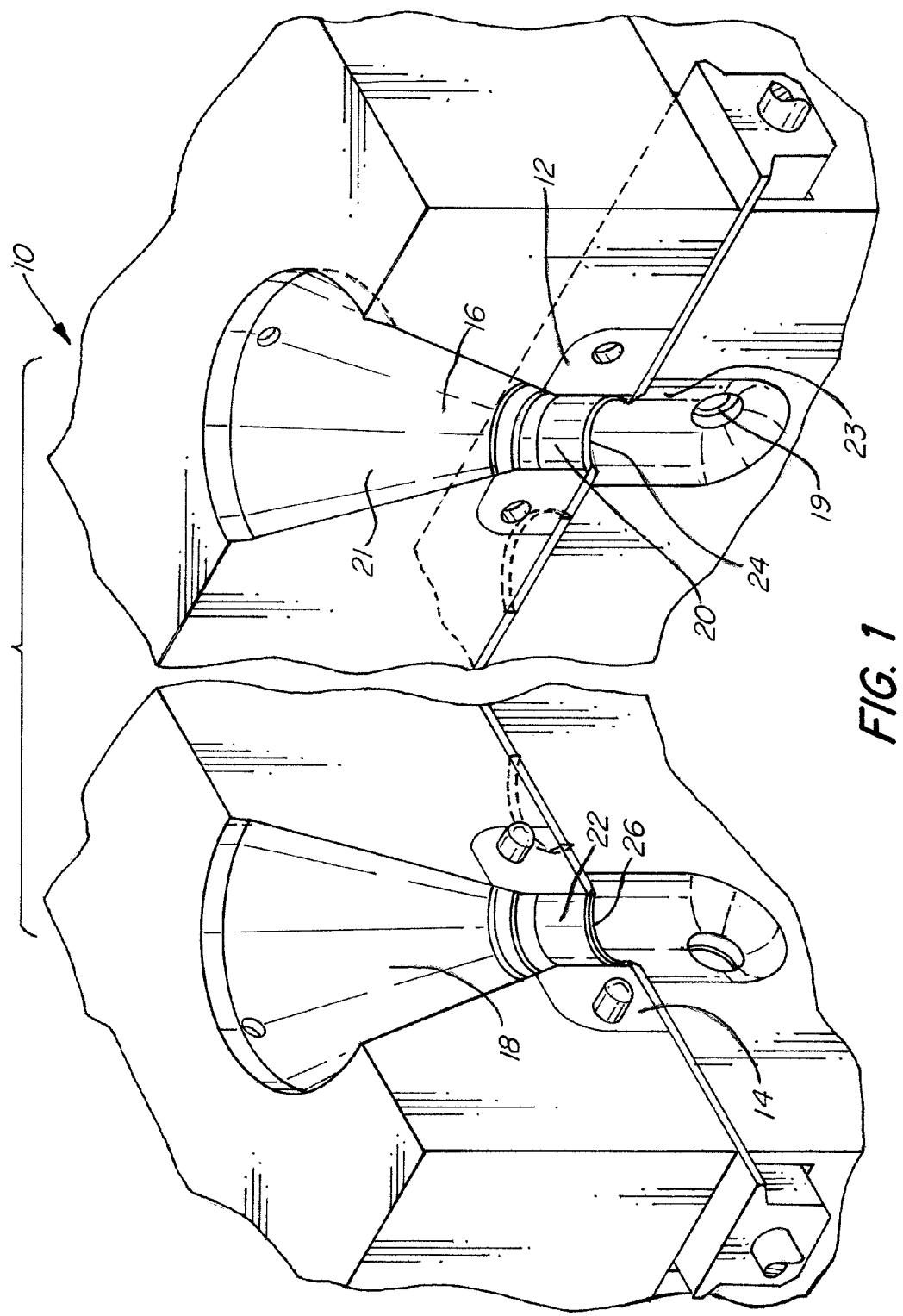
FIG. 1 is perspective view of an apparatus for creating a blow molded article in accordance with the present invention, showing two mold portions in an opened position.

The present teachings are described more fully hereinafter with reference to the accompanying drawings, in which the present embodiments are shown. The following description is presented for illustrative purposes only and the present teachings should not be limited to these embodiments.

As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

One of the novel and advantageous features of the present invention is the precision and control of the inner diameter or inner wall of the blow molded article without using an inner mandrel or a secondary operation to achieve the result. With the system and method of the present invention, in-mold cutting devices are used to control the inner wall position. The design and position of the cutting devices such that the cut occurs at a precise position and achieves a precise thickness of the blow molded article wall.

Figure 2:
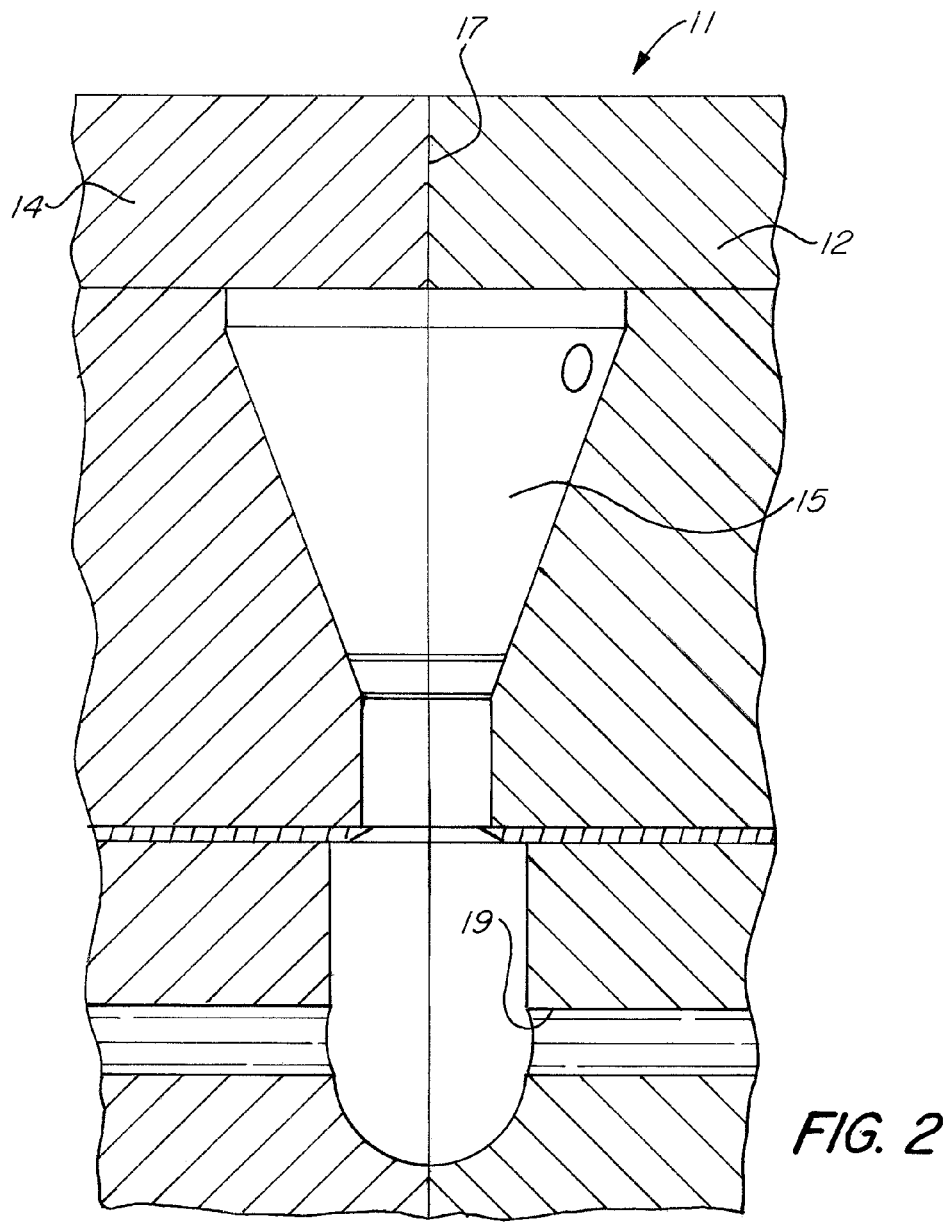
FIG. 2 is a cross-sectional view of the apparatus of FIG. 1, showing two mold portions in a closed position.

The basic components of one embodiment of an apparatus for creating a blow molded article are illustrated in FIGS. 1 and 2. The apparatus includes a mold (11) having a first mold portion (12) and a second mold portion (14). The mold portions may be made with any material suitable for the blow molding process. Each of the first and second mold portions has an inner molding surface (16, 18) against which a wall of a blow molded article is blown during blow molding. Any of various configurations may be employed for the molding surface, depending on a particular blow molded article to be produced. In one advantageous embodiment shown in FIG. 1, the inner molding surface of the first and second mold portions has a shape of a "rose" portion of a watering can, which is a frusto-conical part typically attached to the end of a spout having a plurality of holes therein, through which water pours out of the watering can.

The first mold portion (12) has a first cutting device (20) moveably disposed therein, and the second mold portion has a second cutting device (22) moveably disposed therein. In one advantageous embodiment, the cutting devices are blades with a sharp edge. The first and second cutting devices (20, 22) are positioned at a location in the first and second mold portions (12, 14) respectively where a cut in the blow molded article is desired. For example, in the embodiment illustrated in FIG. 1, the first and second cutting devices (20, 22) define the end point of the rose part (21) and a blow chamber (23), which is discarded after the blow molding.

As shown in FIG. 2, when the first and second mold portions (12, 14) are positioned adjacent each other, they at least partially enclose a mold cavity (15). In operation, a parison (not shown) is placed between the mold portions (12, 14), which are then pressed adjacent each other. The mold cavity (15) encloses a part of the parison, and any unnecessary portions of the parison are pinched off at the seam (17) between the two mold portions (12, 14). Fluid pressure is then introduced through an inlet (19), which blows the parison against the inner molding surface of the mold cavity (15), thereby molding the parison into the shape of an article corresponding to the shape of the mold cavity (15). The pressure is maintained until the molten material cools and hardens. The first and second cutting devices (20, 22) are then actuated and moved across the mold cavity (15), such that a portion of the blow molded article is cut off. The first and second mold portions (12, 14) are then separated, the blow molded article is removed from the mold (11), and the cut off portion is discarded.

The first cutting device (20) and the second cutting device (22) each have a corresponding sharpened cutting surface (24, 26). When the cutting devices are in an activated position shown in FIG. 1, the cutting surfaces (24, 26) protrude into the mold cavity (15) such that the molten parison molds and thins along the cutting surfaces as it is blown against the molding surface. In certain advantageous embodiments, the cutting surfaces (24, 26) extend into the mold cavity by an amount substantially equal to a desired wall thickness of the blow molded article. In other advantageous embodiments, the cutting surfaces (24, 26) extend into the mold cavity by an amount greater than the desired wall thickness of the finished article.

Figure 3:
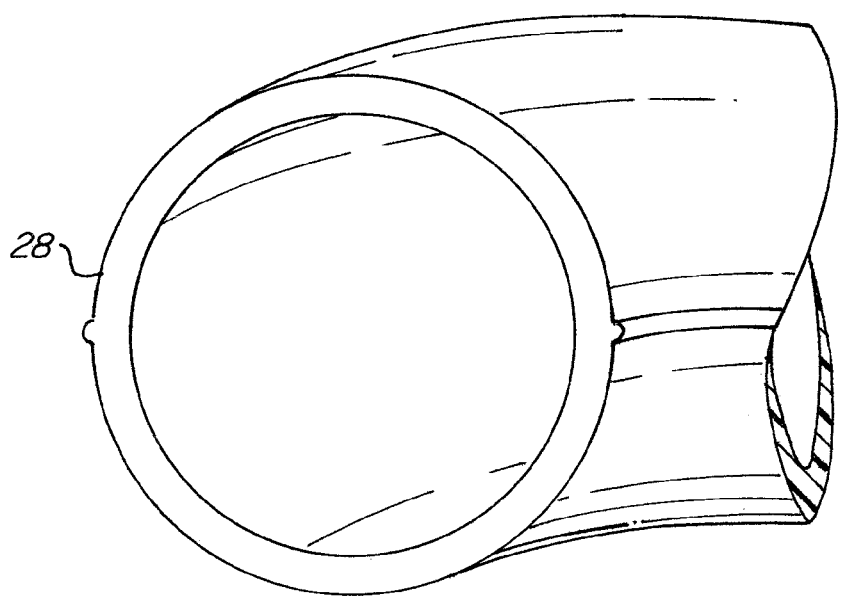
FIG. 3 is a front perspective view of a blow molded article created by the apparatus of FIG. 1.
Figure 4:
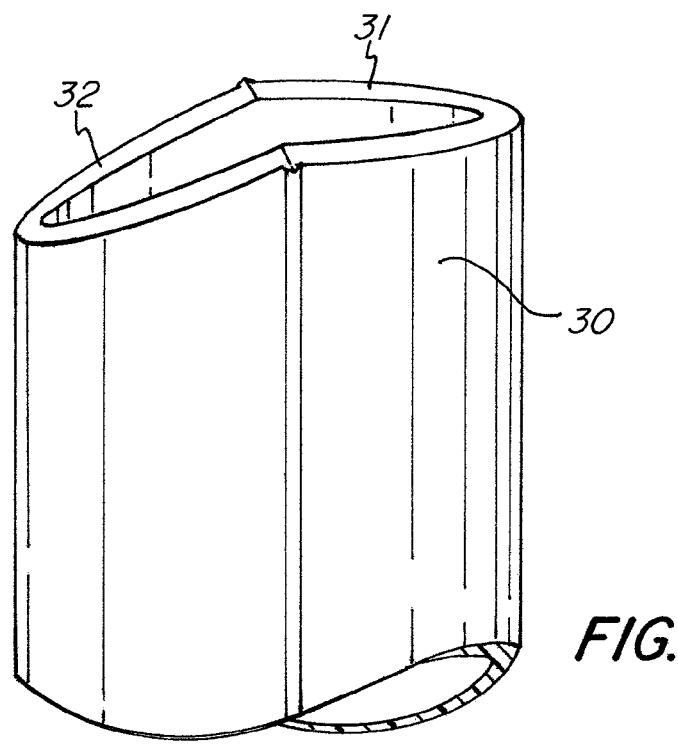
FIG. 4 is side perspective view of another blow molded article created by the apparatus of FIG. 1.

The cutting surfaces (24, 26) of the first and second cutting devices (20, 22) may have various profile shapes depending on a desired shape of the cut to be made in the blow molded article. In one advantageous embodiment illustrated in FIG. 1, the cutting surfaces (24, 26) have a shape that substantially corresponds to the shape of the molding surfaces (16, 18). The cutting devices (20, 22) may be positioned at different angles with respect to the molding surfaces (16, 18) of the first and second mold portions (12, 14) to create different cut shapes. For example, in the embodiment shown in FIG. 1, the first and second cutting devices (20, 22) are positioned perpendicular to the molding surfaces (16, 18). Such positioning of the blades will produce a blow molded article (28) with a simple straight cut, as shown in FIG. 3. In other embodiments, one of the cutting devices may be positioned at an angle with respect to the molding surface, which will produce a blow molded article (30) with a cut having a first profile (31) and a second profile (32), as shown in FIG. 4. It is understood that any desired profile shape of the cutting blade may be used in accordance with the present invention.

Figure 5:
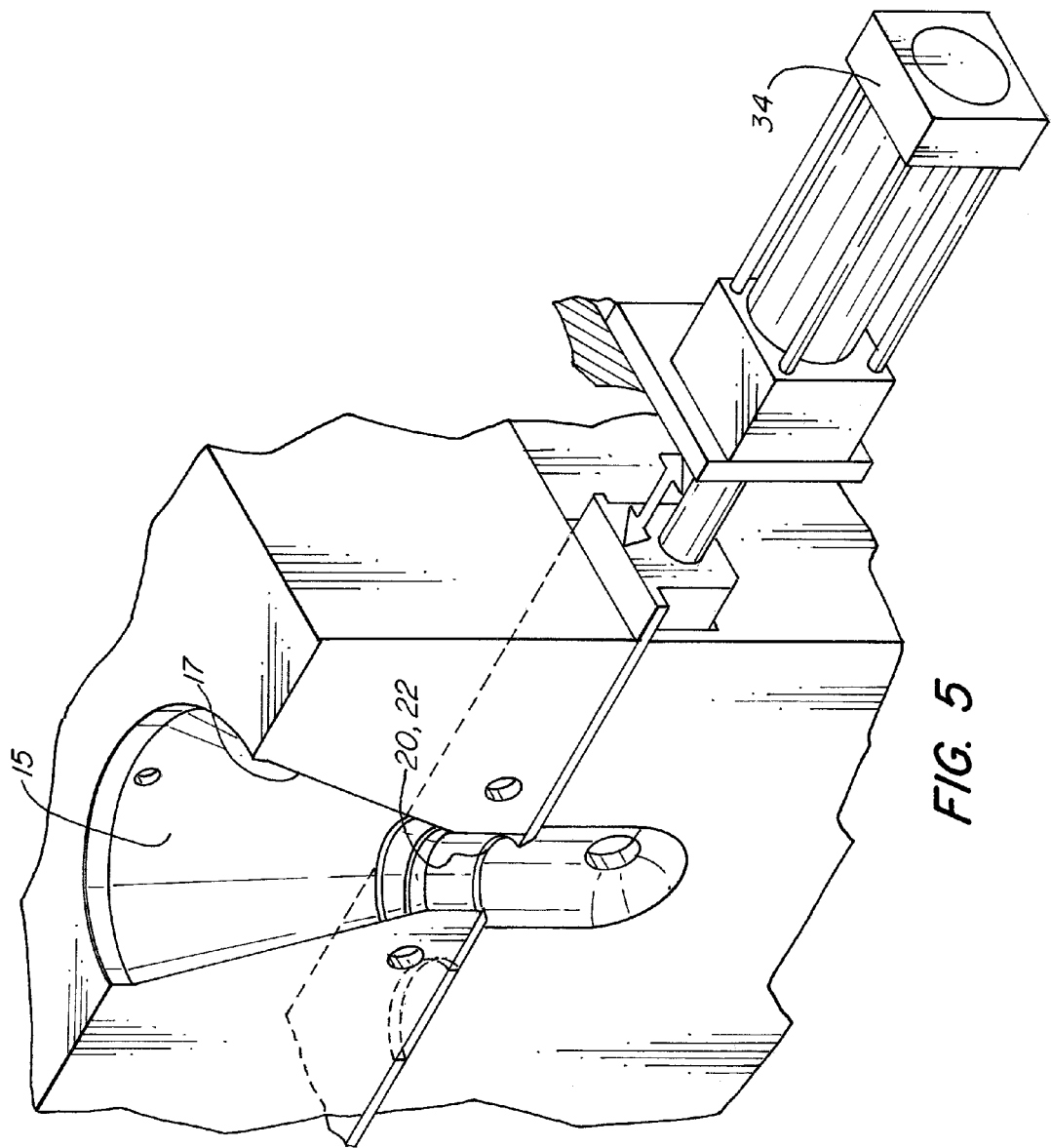
FIG. 5 is a perspective view of one mold portion of the apparatus of FIG. 1, showing an actuator coupled to a cutting device.

The first and second cutting devices (20, 22) are actuated by at least one actuator. In the embodiment shown in FIG. 5, the actuator is a hydraulic cylinder (34) coupled to the cutting devices (20, 22). The actuator (34) moves the first and second cutting devices (20, 22) across the mold cavity (15) to create a cut in the blow molded article. The cutting devices may be actuated in various directions with respect to the seam (17) between the two mold halves (12, 14), thus creating different cut shapes. In the embodiment shown in FIG. 5, the first and second cutting devices (20, 22) are actuated by the hydraulic cylinder (34) in a direction substantially perpendicular to the seam (17), such that a simple straight cut shown in FIG. 3 is created. In other advantageous embodiments, one or both of the cutting devices may be actuated at an angle relative to the seam between the mold halves to create various opening shapes.

In some embodiments, the first cutting device (20) and the second cutting device (22) are actuated in opposite directions across the mold cavity (15), such that the first cutting device is moved to the right, and the second cutting device is moved to the left. This allows a user to create the blow molded article halves with different opening profiles. In other embodiments, the first and second cutting devices (20, 22) move in the same direction across the mold cavity (15) when actuated by the actuator (34).

Figure 6:
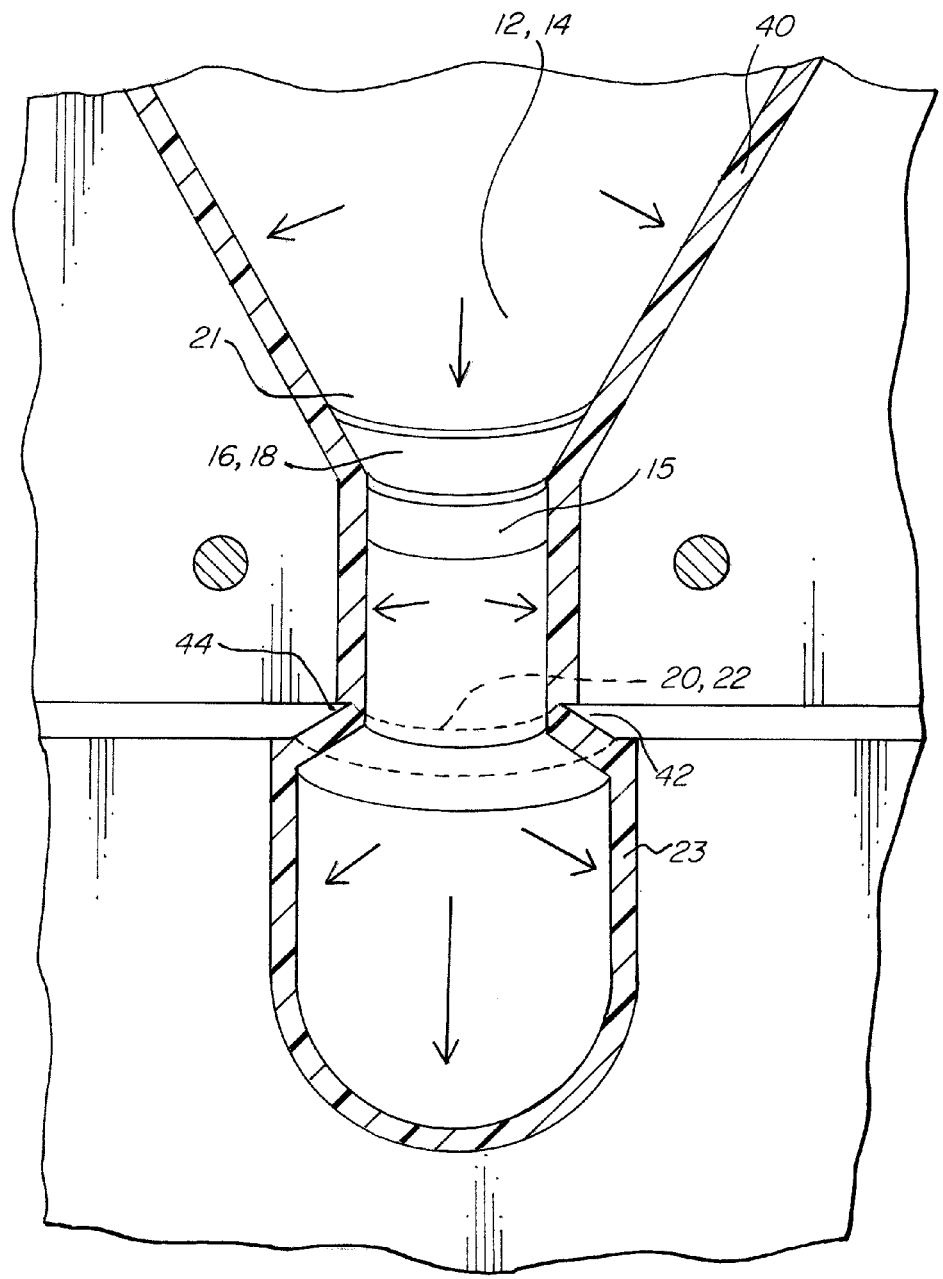
FIG. 6 is a cross-sectional view of the apparatus of FIG. 1, with a blow molded part positioned in the mold.

The method of creating a blow molded article in accordance with the present invention will now be described. First, the first and second cutting devices (20, 22) are positioned into an activated position inside each mold portion (12, 14), such that the cutting surfaces (24, 26) extend beyond the molding surface of each mold portion (12, 14) by a desired amount. A parison of molten material is then disposed between the first and second mold portion (12, 14), such that it covers the molding surface (16, 18) of each portion. Next, the two mold portions are positioned adjacent each other along the seam (17) to at least partially enclose the mold cavity (15) with the parison. Fluid, e.g. gas, is injected under pressure inside the parison (40) to expand it against the molding surface of the mold cavity (15), thereby forming a final shape of the article, as shown in FIG. 6.

Some of the blow molded article's inner wall control occurs during the step of closing the mold. When the two mold portions are adjoined together, the cutting surface (24) of the first cutting device (20) and the cutting surface (26) of the second cutting device (22) closed onto the molten parison and meet at two points (42, 44) along the seam between the two mold halves (12, 14). The parison is thus compressed between the cutting surfaces (24, 26) of the first and second cutting devices (20, 22) at these points (42, 44). As a result, the effective pinch-off is moved from the outer circumference of the blow molded part to a point inside the part. This advantageously eliminates the dip of the part's inner wall at the pinch-off point. In the embodiment shown in FIG. 6, the distance from the molding surface (16, 18) to the cutting surface (24, 26) of the first and second cutting devices (20, 22) is substantially equal to the wall thickness of the part. The parison (40) covers the entire molding surface (16, 18), and the cutting surfaces (24, 26) define the end of the rose part (21) and beginning of the blow chamber discard piece (23).

The thickness of the blow molded article's wall is further controlled during the air-blow step of the process. When the pressurized fluid is injected inside the molten parison (40) in the mold cavity (15), the fluid pressure is controlled via a controller (not shown) to push the molten parison over the cutting surfaces (24, 26) of the first and second cutting devices (20, 22). This, in turn, results in significant thinning of the parison or the part's wall at the cutting surfaces. Due to the thinning, the cutting devices (20, 22) require less force to slice off a portion of the blow molded article. The exact wall thinning at the cutting surface of the first and second cutting devices can be controlled by a design of the cutting surface and pressure of the fluid. Additionally, the positioning of the cutting devices (20, 22) inside the mold portions (12, 14) may also be adjusted, as needed. In certain advantageous embodiments, the shape of the cutting surface and/or fluid pressure will allow the wall of the blow molded article to thin to approximately ten percent of the original wall thickness at the cutting surface.

Figure 7:
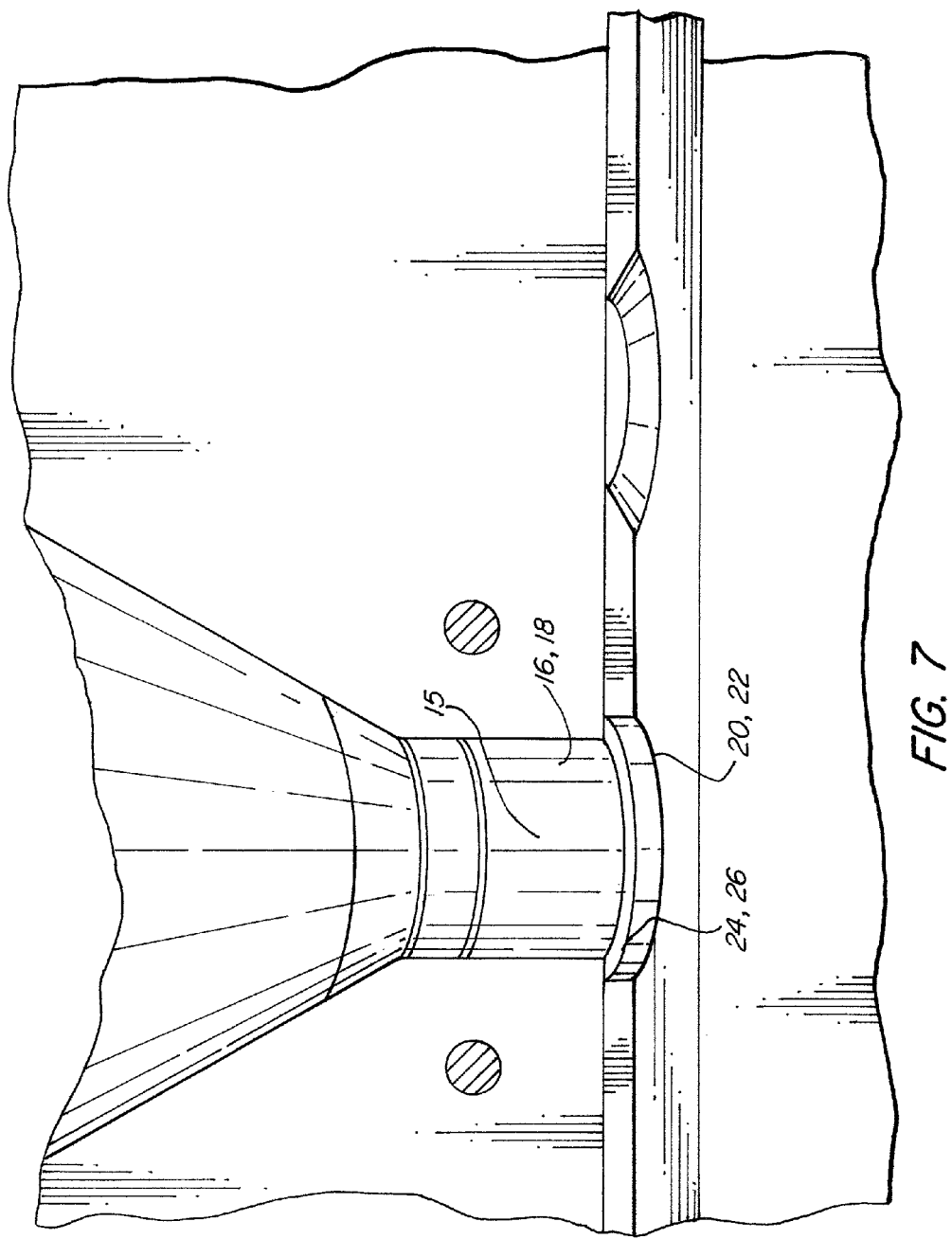
FIG. 7 is a perspective view of one mold portion of the apparatus of FIG. 1, showing the cutting device in an inactivated position.

Once the molten part (40) begins to cool and solidify, the first and second cutting devices (20, 22) are moved by the actuator across the mold cavity (15) to slice the part open at the intended location. The first and second cutting devices (20, 22) are moved into an inactivated position shown in FIG. 7, wherein the cutting surface (24, 26) of the cutting devices do not extend beyond the molding surface (16, 18) of the mold cavity (15). In this position, the cutting devices (20, 22) provide a larger opening for easy ejection of the blow molded article from the mold. Then, the two mold portions (12, 14) are opened, and two parts of the finished blow molded article are extracted from the mold. The discard piece that is cut off during the blow molding process may be recycled.

With the combination of mold compression and fluid pressure points of control, the overall wall dimension is calculated to provide the precise finished dimension of the inner wall on the molded part. Thereby, the normal blow molding process variation of the inner wall is eliminated. Additionally, due to the change in inner wall position created by the blade, the finished part opening is almost perfectly round, as shown in FIG. 3. In contrast with known prior art systems and methods, there is no indentation and no leak caused by the inner wall when mated with connection parts.

The staged cutting system and method of the present invention is not limited to tubular blow molded parts. Nearly any opening shape can be achieved. As described above, the cutting devices may be placed in various locations on the mold halves, may have various blade profiles, and may be actuated in different directions.

Additionally, in some advantageous embodiments, the cutting devices may be staged in a position where the cutting surface of the first and second cutting devices intrudes into the mold cavity by more than the desired wall thickness of the blow molded article. As a result, a diameter of the sliced opening is smaller than the nominal inner dimensions of the part, which creates an inner wall lip or return edge on the blow molded article. This return edge can be used as an interference locking feature to secure mating parts inside the blow molded article, such as multiple tubular parts connected by controlled inner and outer diameters to create continuous duct pipes. Because the thickness of the wall and the return edge can be precisely controlled using the system and method of the present invention, the locking feature is more secure compared to conventional blow molded assemblies.

It is important to note that the staged cutting system and method of the present invention presents significant advantages over other prior art techniques, such as sawing or guillotining the blow molded parts. The internal air pressure of the blow molding process pushes the plastic wall outward, and the sharpness of the cutting devices cuts into the plastic when that air pressure is applied. This results in a very thin membrane of plastic at the tip of the cutting devices, which essentially eliminates the effect of wall thickness variation on the dimensional position of the final opening in parts made using this novel method. All other post-molding cutting methods are significantly affected by wall thickness variation.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. An apparatus for creating a blow molded article, comprising:
   a mold comprising first and second mold portions that, when located adjacent each other along a seam, at least partially enclose a mold cavity, wherein said mold cavity at least partially defines a molding surface against which a wall of the blow molded article is blown during blow molding;
   a first cutting device moveably disposed in said first mold portion; and
   a second cutting device moveably disposed in said second mold portion;
   wherein said first and second cutting devices have a starting position, in which each has a cutting surface that extends into said mold cavity by an amount substantially equal to a desired wall thickness of the blow molded article such that the wall of the blow molded article is blown against the cutting surface during blow molding, and a cutting position, in which each of said first and second cutting devices is displaced across the mold cavity.

2. The apparatus according to claim 1, wherein said cutting surface of said first and second cutting devices has a shape that substantially corresponds to a shape of said mold cavity.

3. The apparatus according to claim 1, further comprising at least one actuator coupled to said first cutting device and said second cutting device for actuating said first and second cutting devices into an inactivated position, in which the cutting surface of said first and second cutting devices does not extend into said mold cavity.

4. The apparatus according to claim 3, wherein said at least one actuator actuates said first and second cutting devices across said mold cavity in a direction substantially perpendicular to the seam between said first and second mold portions.

5. An apparatus for creating a blow molded article, comprising:
   a mold comprising first and second mold portions that, when located adjacent each other along a seam, at least partially enclose a mold cavity, wherein said mold cavity at least partially defines a molding surface against which a wall of the blow molded article is blown during blow molding;
   a first cutting device moveably disposed in said first mold portion;

a second cutting device moveably disposed in said second mold portion; and at least one actuator coupled to said first cutting device and said second cutting device for actuating said first and second cutting devices;

wherein said at least one actuator actuates said first and second cutting devices across said mold cavity in a direction substantially perpendicular to the seam between said first and second mold portions;

wherein said first and second cutting devices, when in an activated position, each have a cutting surface that extends into said mold cavity by an amount substantially equal to a desired wall thickness of the blow molded article; and wherein said first cutting device and said second cutting device move in opposite directions across said mold cavity when actuated by said at least one actuator.

6. The apparatus according to claim 4, wherein said first cutting device and said second cutting device move in the same direction across said mold cavity when actuated by said at least one actuator.

7. The apparatus according to claim 3, wherein said at least one actuator is a fluid cylinder.

8. The apparatus according to claim 1, further comprising an opening in said mold cavity through which a pressurized fluid is introduced into the mold cavity.

9. The apparatus according to claim 1, wherein, when said first mold portion and said second mold portion are positioned adjacent each other, said first and second mold portions abut each other along the seam.

10. The apparatus according to claim 1, wherein at least one of said first cutting device and said second cutting device is positioned at an angle with respect to said molding surface.

11. An apparatus for creating a blow molded article, comprising:

a mold comprising first and second mold portions that, when located adjacent each other along a seam, at least partially enclose a mold cavity, wherein said mold cavity at least partially defines a molding surface against which a wall of the blow molded article is blown during blow molding;

a first cutting device moveably disposed in said first mold portion; and a second cutting device moveably disposed in said second mold portion;

wherein said first and second cutting devices have a starting position, in which each has a cutting surface that extends into said mold cavity by an amount greater than a desired wall thickness of the blow molded article such that the wall of the blow molded article is blown against the cutting surface during blow molding, and a cutting position, in which each of said first and second cutting devices is displaced across the mold cavity.

12. The apparatus according to claim 1, wherein at least one of said first cutting device and said second cutting device is positioned perpendicular to said molding surface.

13. The apparatus according to claim 11, wherein said cutting surface of said first and second cutting devices has a shape that substantially corresponds to a shape of said mold cavity.

14. The apparatus according to claim 11, further comprising at least one actuator coupled to said first cutting device and said second cutting device for actuating said first and second cutting devices into an inactivated position, in which the cutting surface of said first and second cutting devices does not extend into said mold cavity.

15. The apparatus according to claim 14, wherein said at least one actuator actuates said first and second cutting devices across said mold cavity in a direction substantially perpendicular to the seam between said first and second mold portions.

16. The apparatus according to claim 14, wherein said at least one actuator is a fluid cylinder.

17. The apparatus according to claim 11, wherein said first cutting device and said second cutting device move in the same direction across said mold cavity when actuated by said at least one actuator.

18. The apparatus according to claim 11, further comprising an opening in said mold cavity through which a pressurized fluid is introduced into the mold cavity.

19. The apparatus according to claim 11, wherein, when said first mold portion and said second mold portion are positioned adjacent each other, said first and second mold portions abut each other along the seam.

20. The apparatus according to claim 11, wherein at least one of said first cutting device and said second cutting device is positioned at an angle with respect to said molding surface.

21. The apparatus according to claim 11, wherein at least one of said first cutting device and said second cutting device is positioned perpendicular to said molding surface.

* * * * *